Patented July 16, 1935

2,007,980

UNITED STATES PATENT OFFICE 2,007,980

COLOR MATERIAL AND PROCESS FOR MAKING SAME

Henry T. Neumann, New York, N. Y., assignor to Henry T. Neumann Research Inc., New York, N. Y., a corporation of New York No Drawing. Application August 10, 1931, Serial No. 556,313

15 Claims. (Cl. 134—58.5)

This invention relates to color materials.

It has for its object the provision of a highly efficient material or composition of matter for use in the production of paints, printing inks, and the like products.

More particularly among the objects of the invention is the provision of a material of the character and for the purpose described whereby color concentrates or lakes may be easily and economically produced, and which shall be capable of being made up in desired gradations of color and which shall be highly fast to light and also to alkalis, acids and alcohols.

Heretofore colored concentrates or lakes known as mineral colors have been made from solutions of inorganic substances with a precipitating agent or reagent to form the color base. This base is then treated to produce the necessary color material. The resulting product is oft times limited in color range and moreover requires further treatment, as for example extensive grinding, before incorporation into the final product such as printing inks, paints and the like. The color materials so produced have thus been limited in their application, and involve comparatively high manufacturing costs.

The limited color range of these materials is obvious from the fact that the shade or grade of color is entirely dependent upon the color precipitate obtained and the latter is definitely fixed in amount by the chemical reaction employed, since definite proportions of the inorganic solution and reagents are required for each particular chemical reaction. This is of course likewise true when organic substances such as dyes are used in the production of lakes. In the latter method the original dye is precipitated with an inorganic substance, for example lead acetate, barium chloride or tungstic acid. Moreover in order that the resulting product may have the desired bulk and brilliance the precipitate has to be formed on some other chemical as a nucleus or base, such for example as aluminum hydroxide, titanium oxide or barium sulphate. These latter substances while adding no value to the particular lake very often in the application of the lake for its various purposes react with the other adjuncts and thus limit the use and efficiency of the lake.

Another difficulty with color concentrates produced by methods such as aforedescribed is that upon drying, the precipitate becomes very lumpy and hard and often resists extensive grinding. Furthermore by reason of their gritty content or character these color concentrates cannot be used for some industrial purposes, as for example in the making of printing inks, and therefore find their main use as fillers or extenders in paint. Moreover, when these color concentrates come in contact with alcohol solutions, what is known as "bleeding" results.

It is the further object of my invention to overcome these and other difficulties and disadvantages.

Other objects of this invention will in part be obvious and in part hereinafter pointed out.

I attain these and other objects in general by the employment of a colloidal clay, which is caused to react with the original aniline or natural dye in such manner as to make the resulting color product highly effective and available for incorporation with the other ordinary adjuncts used in the production of paints and the like articles, such as zinc oxides, and the like adjuncts depending upon the particular material or article to be produced.

More particularly in accordance with my invention I employ a colloidal micaceous clay in finely powdered or dust form, as the means for adsorbing and absorbing the aniline or natural dye to produce the desired color concentrate. I have found in particular as best suited for this purpose a colloidal clay which normally swells in the presence of water and which is usually known and hereinafter referred to as bentonite, which occurs as a natural deposit. The crude bentonite is first crushed and ground in a series of grinders, and preferably heat is applied during the grinding operation to drive off any moisture that may be present in the crude bentonite. The crushing and grinding operations liberate a very fine dust free from heavy salts and grit and this dust is collected and treated as hereinafter described.

The employment of this dust directly without further treatment for the absorption and adsorption of the color base is impractical because the bentonite dust by reason of its colloidal character becomes gelatinous and swells into a large mass or bulk in the presence of water, the usual dye carrier. I have found that the formation of such gelatinous and bulky mass may be prevented by treating the powder bentonite or the bentonite dust with or subjecting it to the action of an alcohol such as methyl alcohol, ethyl alcohol, or other aliphatic alcohols which are liquid at ordinary temperatures. When the aniline or natural dye dissolved in any desirable solvent is then added to the so treated bentonite the latter readily absorbs and adsorbs the dye without any gelatinization or swelling, and there results a color concentrate or lake which is thus simply and cheaply produced and lends itself to ready, effective and efficient use with other adjuncts for making inks, paints and the like materials.

Moreover the gradation or color tone can be completely and closely controlled over a wide range by the amount of absorption and adsorption and the concentration of the aniline or natural dye used. Furthermore the resulting material pulverizes or disintegrates quite easily so that no further extended grinding is required, and is free from grit thus making it available for a very broad range of industrial manufactures. I have found further that the absorption and adsorption is complete to the point that no perceptible amount of dye in solution is found in the residual carrier, and the color concentrate being directly proportional to the quantity of dye employed almost any desired gradation of a single color may be obtained.

Likewise the intensity of the color from very deep to very light tones may be varied by mixing the concentrate with a litho varnish and adding for example aluminum hydroxide mixed with an oil (such as linseed oil) or titanium oxide or barium sulphate in proper quantities.

The concentrate may be made fast by treating or mordanting the same with a solution of copper sulphate and I have found the degree of light fastness as well as fastness to alkalis, acids and alcohols is exceedingly high. As an example of carrying out my invention I give the following:

One method of carrying out my invention, as above indicated, is to treat the bentonite dust directly with an alcohol so as to precondition it against gelatinization and swelling when it is mixed with the water dye solution. In this method preferably the proportions used should be about one gram of bentonite to two or three cc. of alcohol.

Preferably, however, the operation may be simplified by employing an alcohol instead of water solution or the natural or synthetic dye.

An example of carrying out my invention follows:

I take two gms. of a basic fuchsine dye, and dissolve this in 100 cc. of an alcohol such as methyl, ethyl or the like. After the dye is completely dissolved (heating, if necessary), 50 gms. of bentonite are added, thoroughly stirred and brought to a boil. The colored mass is then filtered and dried by heat or other means. This method is particularly adapted for making color concentrates to be used for manufacturing printing inks, paint and the like materials.

Another method of carrying out my invention is to take 2 gms. of a basic fuchsine dye, dissolve this completely in 100 cc. of an alcohol, and then thoroughly stir 50 gms. of the bentonite into the solution. 500 cc. of water is then added and the entire mixture brought to a boil and kept boiling for a period of 15 to 30 minutes until the liquid appears water white. The excess liquid is then filtered from the mass, and the mass dried. The concentrate produced by this method is well adapted for incorporation with adjuncts into commercial products where bleeding in alcohol and water is particularly to be avoided.

As indicated in the above examples, I employ a coloring agent which is soluble in a solvent of the class consisting of water and alcohol. While particular reference has been made to printing inks and paints, it will of course be understood that any color concentrate may be used in making all sorts of colored articles such as colored concrete, soaps, plastics, asbestos shingles, ceramics and the like.

It will thus be seen that there is provided a material and process in which the several objects of this invention are achieved, and which is well adapted to meet the conditions of practical use.

As various embodiments might be made of the above invention, and as various changes might be made in the embodiments above set forth, it is to be understood that all matter herein set forth is to be interpreted as illustrative and not in a limiting sense.

Having thus described my invention I claim as new and desire to secure by Letters Patent:

1. In the art of preparing a color concentrate, the step of rendering bentonite non-swelling in the presence of water consisting in treating said bentonite with a liquid aliphatic alcohol at boiling temperature in the proportion of one gram of bentonite to two or three cc. of the alcohol.

2. The art of making a color concentrate consisting in boiling bentonite with an alcohol solution of a dye.

3. The art of making a color concentrate consisting in boiling ungelatinized bentonite with an alcohol solution of a dye and water.

4. The art of preparing bentonite for use as a color material consisting in treating said bentonite with a boiling liquid aliphatic alcohol which will prevent swelling and gelatinization thereof in the presence of water.

5. A color concentrate comprising ungelatinized and non-swelling bentonite carrying a coloring dye soluble in a solvent of the class consisting of water and alcohol.

6. A color concentrate comprising ungelatinized and non-swelling bentonite in powdered form carrying a coloring dye soluble in a solvent of the class consisting of water and alcohol.

7. A color concentrate comprising ungelatinized and non-swelling bentonite carrying a water soluble coloring dye.

8. In a method of preparing a color concentrate, the step of treating bentonite with a liquid aliphatic alcohol at boiling temperature whereby said bentonite is rendered non-swelling.

9. The method of preparing a color concentrate which comprises treating bentonite and a dye soluble in a solvent of the class consisting of water and alcohol with alcohol at a boiling temperature.

10. The method of preparing a color concentrate from bentonite which normally swells in the presence of a swelling agent, which method comprises inhibiting the swelling property of the bentonite and then adding a dye to said bentonite in the presence of such swelling agent.

11. The method of preparing a color concentrate from bentonite which normally swells in the presence of water, which method consists in inhibiting the swelling property of the bentonite by treating the same with alcohol at boiling temperature before the bentonite is swelled by water, and adding a dye to said bentonite in the presence of alcohol.

12. A method of the character described which consists in dissolving a dye in alcohol, adding bentonite, and boiling the mixture.

13. A method of the character described, consisting in dissolving a basic fuchsine dye in alcohol, adding bentonite, thoroughly stirring the mixture and bringing the same to a boil, then filtering and drying.

14. A method of the character described, consisting in dissolving a dye in alcohol, adding bentonite to the solution, then adding water and bringing the entire mixture to a boil, maintaining the mixture at a boil until the liquid appears water white, then filtering the excess liquid from the mass and drying the mass.

15. A color concentrate comprising ungelatinized bentonite rendered non-swelling in the presence of water and carrying a water-soluble dye adsorbed therein.

HENRY T. NEUMANN.